United States Patent
Apodaca Salinas et al.

(10) Patent No.: US 10,762,487 B2
(45) Date of Patent: Sep. 1, 2020

(54) SUPPORT SYSTEM AND METHOD FOR THE MANAGEMENT OF BEVERAGES BARS IN POINTS OF SALE

(71) Applicant: EXPLOSION MOVIL S. DE R.L. DE C.V., Hermosillo, Sonora (MX)

(72) Inventors: Carlos Apodaca Salinas, Hermosillo (MX); Jose Manuel Orduño Flores, Hermosillo (MX); Luis Edgardo Ochoa Blancarte, Hermosillo (MX)

(73) Assignee: EXPLOSION MOVIL S. DE R.L. DE C.V., Hermosillo, Sonora (MX)

( * ) Notice: Subject to any disclaimer, the term of this patent is extended or adjusted under 35 U.S.C. 154(b) by 0 days.

(21) Appl. No.: 16/585,938

(22) Filed: Sep. 27, 2019

(65) Prior Publication Data
US 2020/0027071 A1    Jan. 23, 2020

Related U.S. Application Data

(63) Continuation of application No. PCT/MX2017/000040, filed on Mar. 31, 2017.

(51) Int. Cl.
*G06Q 20/20* (2012.01)
*A47J 31/56* (2006.01)

(52) U.S. Cl.
CPC .......... *G06Q 20/208* (2013.01); *A47J 31/56* (2013.01); *G06Q 20/203* (2013.01)

(58) Field of Classification Search
CPC ...... G06Q 20/208; G06Q 20/203; A47J 31/56
(Continued)

(56) References Cited

U.S. PATENT DOCUMENTS

| | | | |
|---|---|---|---|
| 6,354,498 B1 * | 3/2002 | Lutz | G07G 1/0054 186/52 |
| 7,512,546 B2 * | 3/2009 | Iijima | G06Q 10/06 705/16 |

(Continued)

FOREIGN PATENT DOCUMENTS

| | | |
|---|---|---|
| WO | WO 0245559 | 6/2002 |
| WO | WO 2012083194 | 6/2012 |
| WO | WO 2017015576 | 1/2017 |

OTHER PUBLICATIONS

International Search Report for PCT/MX2017/000040 dated Dec. 14, 2017.

*Primary Examiner* — Michael G Lee
*Assistant Examiner* — David Tardif
(74) *Attorney, Agent, or Firm* — Schlesinger, Arkwright & Garvey LLP

(57) ABSTRACT

The present invention describes a Support System and Method for the Management of Beverages Bars in Points of Sale composed of a data manager, a message center, data control and acquisition modules, mobile device, fixed device, a database, that continually register the activity in the beverage preparation machines and beverages display containers to determine when they require attention informing, through the message center, the personnel that operate the points of sale of pending tasks to perform in order to have the displayed beverages fresh and prepared on time, reporting to the supervisor through mobile and/or fixed devices when said tasks haven't been attended to and when they were finally performed.

The objective of this invention is to provide a tool that allows to increase the attention to the beverage preparation machines in points of sale where the freshness of beverages and the attention they require is crucial and the point of sale personnel have abundant activities to perform, as well as having a tool for the optimization of ingredient inventories, predictive maintenance alarms and the generation of statistical information to improve the attention to said products.

11 Claims, 1 Drawing Sheet

(58) Field of Classification Search
USPC .......................................................... 235/383
See application file for complete search history.

(56) References Cited

U.S. PATENT DOCUMENTS

| | | | | |
|---|---|---|---|---|
| 8,863,987 | B2* | 10/2014 | Jacobs | A47J 31/52 |
| | | | | 222/108 |
| 9,542,151 | B2* | 1/2017 | Hoog | A23F 5/265 |
| 2004/0215521 | A1* | 10/2004 | Crisp, III | B67D 1/0057 |
| | | | | 705/22 |
| 2010/0280895 | A1 | 11/2010 | Mottola | |

* cited by examiner

SUPPORT SYSTEM AND METHOD FOR THE MANAGEMENT OF BEVERAGES BARS IN POINTS OF SALE

TECHNICAL FIELD

The technical field of the present invention is electrical, given that it deals with a system that involves electrical sensors, digital processing and control module, unfolding screen, wireless communications module, and data management and storage equipment.

BACKGROUND OF THE INVENTION

In certain points of sale where diverse products are sold, situations generally arise that cause distraction to the personnel from the tasks that they must carry out in order to maintain the freshness, presentation and stock of products of high rotation, an example of which are hot beverages like coffee, tea and other similar beverages, where it must be monitored that there is enough product displayed, with adequate freshness and maintain stocks of the supplies. In some cases, where coffee is prepared to be displayed in thermic containers, it must be avoided that it exceeds its expiration time of freshness and temperature, that there is purified water to supply the coffee maker, that every type of flavor of the beverage is deposited in the container that corresponds to it and to place the containers in their display places. This group of activities must frequently be carried out at the same time as is carried out the cleaning of the shop, replenishment of other products, arrangement, customer service, among others, which causes the personnel to forget to prepare new beverages to refill the containers, or the customers to carry expired product that discredits its quality, which provokes subsequent loss of sales. Additionally, keeping an exact record of the sale of this class of products or of its wastage is a complicated labor; as is knowing what quantity of product to display to reduce wastage. Systems exist that help the shop personnel to organize their labors based on lists of tasks that are sent out dynamically, however, they are not adaptive in real time nor do they detect when the product displayed in a container runs out.

The patent application No. US 20100280895 A1 entitled "Food and beverages ordering, preparation, management and pricing system and method" mentions a system that permits the client to order a beverage according to their requirements of nutritional value and attached to an existing list of possible ingredients, this offers a partial solution to the mentioned problems.

The U.S. Pat. No. 7,512,546 B2 entitled "Store system" mentions a system of management of shops that has a screen that shows instructions for the personnel and allows to record audio as memos of pending tasks or observations during their realization. This doesn't offer adaptability to non-programmed events or events which require direct observation, which doesn't diminish the complexity of the personnel's daily realization of tasks.

The US Pat. No. 20040215521 entitled "Beverage dispensing system and apparatus" mentions a beverage vending machine that has an information system that detects when one of the ingredients runs out warning the suppliers in order that it is replenished.

The present invention proposes a system that helps the personnel of the shop to reduce the level of attention that they need to dedicate to the beverages bar through a sensor set, a control system, a data base, a display and communications that send out dynamically the tasks that are required to be done based on the sale, product expiration, the provision of supplies, detection of the type of container to avoid undesirable cross of products and provides dynamic recipe change without the intervention of personnel.

DESCRIPTION OF THE INVENTION

The characteristic details of this new Support System and Method for the Management of Beverages Bars in Points of Sale, are shown clearly in the following description and in the accompanying drawings, following the same reference signs to indicate the parts and the figures shown. Said figures are described briefly:

DETAILED DESCRIPTION OF THE INVENTION

Figure 1:
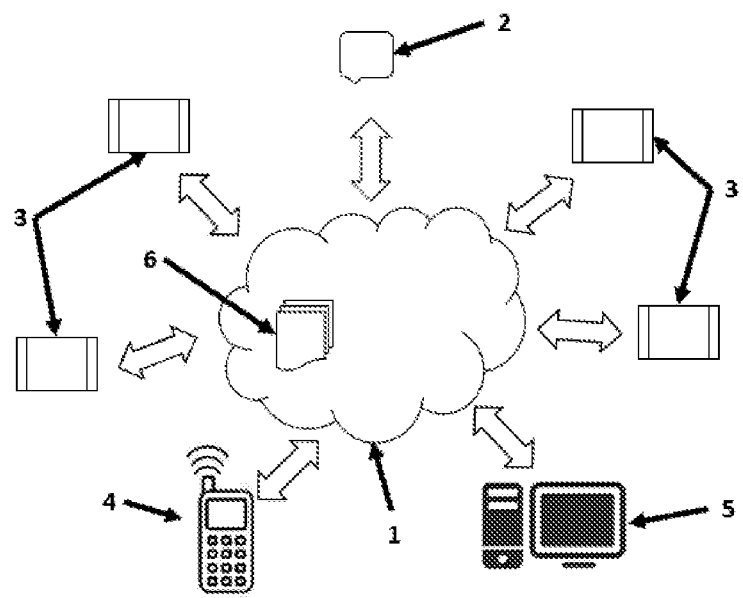
FIG. 1 is a diagram of the architecture of the system.
Figure 2:
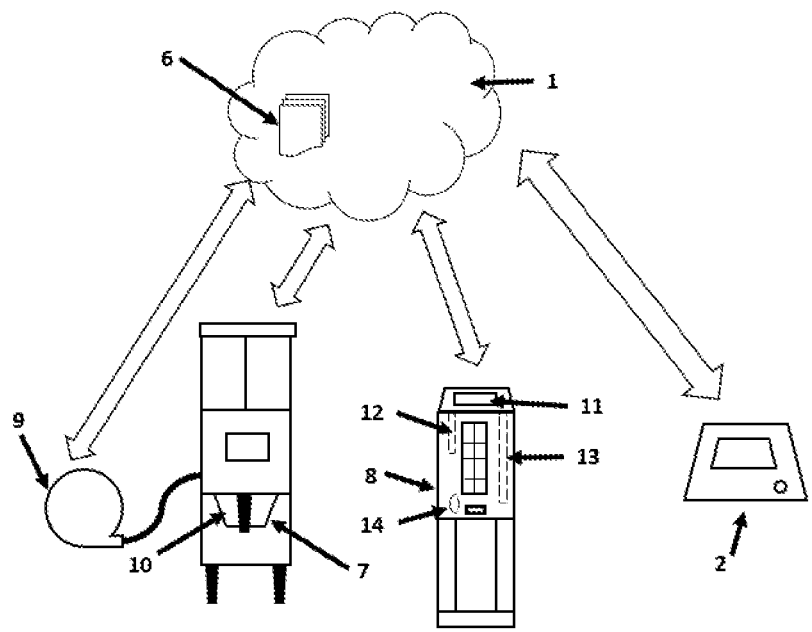
FIG. 2 is a diagram operation coffee maker—beverage display container—message center.

With reference to FIG. 1 Support System for the Management of Beverages Bars in Points of Sale is composed of:
Data manager (1)
Message center (2)
Data control and acquisition modules (3)
Mobile device (4)
Fixed device (5)
Data base (6)
Coffee maker (7)
Display container (8)
Water supply device (9)
Filter holder (10)
Freshness screen (11)
Temperature sensor (12)
Liquid level sensor (13)
Data tag (14)

The operation of the Support System for the Management of Beverages Bars in Points of Sale works based on registering and giving responses to events generated by the data control and acquisition modules (3) installed internally in beverage preparation machines and product display containers (8), located in different points of sale. Each data control and acquisition module (3) obtains data from the different sensors and detectors periodically generating the communication sequence with the data manager (1), which is responsible of registering data, including date and time data in its database (6); additionally the data manager channels the data that it receives from each data control and acquisition module (3) sending it to another of the data control and acquisition modules with the purpose of generating control commands and/or for the mobile device (4) and/or for the fixed device (5) such as alarms, statistical information or operation values in real time. Each time that a data control and acquisition module (2) establishes communication with the data manager (1) to verify what pending messages and commands it has, it is able to update its code and the beverage recipes that it can prepare. The data manager (1) keeps track in the database (6) of all the events that occur with each data control and acquisition module (3), said information is used by applications that are run on a mobile device (4) and a fixed device (5) to generate statistical information of display and of the beverage preparation machine, including data control and acquisition modules (3) use behavior. These modules send messages to the data manager (1) which registers them in the database (6), containing time of operation and activations counting information of each element of the beverage preparation machines remaining registered when a fault occurs, which serves as statistical information for reports and predictive maintenance alarms, upon keeping an operation history of each control element. A maintenance alarm is generated and sent to the maintenance manager when an element nears the average time between faults or the average number of activations before a fault that is registered in the history that exists for said element in the database.

In the case of application in coffee grinding and infusion machines or coffee makers (7) where it coexists with prepared product display containers (8) and the water supply device (9), on using the coffee maker (7), the incorporated data control and acquisition module (3) detects that there is a display container (8) through the wireless reading of the data tag (14) as well as determining the corresponding recipe to prepare to refill said container, it verifies that it already has water at the calibrated temperature, verifies the existence of a supply of water checking the water supply device (9) and starts the communication sequence with the data manager (1) in order to check which recipe it must prepare to serve said container and what quantity of product it must prepare. Once the preparation has concluded, the data control and acquisition module (3) sends a notice of the end of the sequence to the data manager (1), which generates a record which includes the date and time of preparation, the quantity and the recipe in the database (6), assigns an identification code to the preparation that has just started its display, the code of the detected display container (8), on reading by proximity the data tag (14), the geographic location of the point of sale where the preparation was done and sends a message to its display on the data control and acquisition module (3) incorporated to said display container (8) that shows on the freshness screen (12) a text message that indicates the freshness of the beverage, the type of beverage and in its case if the product that it contains has run out and sends another alarm message to the message center (2) that emits an alarm sound and shows the point of sale personnel a text that indicates to them that the following task is to place the display container (8) in its service location.

The display container (8) has a data tag (14) for its identification and incorporates a data control and acquisition module (3) that has a temperature sensor (12), a liquid level sensor (13) and a freshness screen (11), which periodically obtains a reading from said sensors, and takes count of the expiration time according to the last preparation record that was sent to it by the data manager (1). When the display container (8) is activated, it starts the communication sequence with the data manager (1) checking if there is information pending delivery to it, if a record exists on the database (6) of a beverage preparation that still hasn't reached the pre-established expiration time in the recipe, the container will show on its freshness screen a text that indicates that the beverage is still fresh or that it has already expired in the case that the beverage preparation has already reached the end of its pre-established freshness time in the recipe. When the data control and acquisition module (3) determines that the beverage has run out or expired due to no longer having the pre-established temperature, it sends a message to the data manager (1) and displays on the freshness screen (11) a text that indicates that the beverage expired, communicating with the data manager (1) that registers said event in the database (6), storing in said record the corresponding information to the way in which the product display cycle of said display container (8) ended and it sends an alarm message to the message center (2) that emits an audible notice and shows the point of sale personnel a text that indicates to them that the following task is to prepare again the beverage for the indicated display container (8). The display container (8) may not include the level sensor and in this embodiment its data control and acquisition module (3) infers the level of beverage based on the temperature behavior that the temperature sensor (12) registers, keeping track of the last fifteen temperature measurements in said display container (8) in such a way that if a difference greater than 4 degrees exists between the first and last temperature reading the data acquisition module (3) determines that the container has been empty.

The water supply device (9) emits a message to the data manager (1) when it detects that there isn't sufficient water to continue, which prompts the data manager (1) to register the event in the database (6) and sends an alarm message to the message center (2) which emits an audible signal and shows on the screen a text indicating to the point of sale personnel that the following task is to ensure the water supply for the beverage preparation machines. Also, the data manager (1) sends to the data control and acquisition module (3) incorporated to the coffee maker (7) a command to detain the intake of water and, once the supply of water is re-established, it sends another command to restart the intake of water. Once the data control and acquisition module (3) of the water supply device (9) detects that the supply was re-established, it sends a message indicating this fact to the data manager (1) which registers the event in the database (6) and in turn sends to the message center (2) that deletes the mentioned text.

The water supply device (9) detects cases of absence of water or the current state of its operation, either if it's turned on or has been turned off, it starts the communication session with the data manager (1) and sends said message to it, where the data manager registers in the database (6). Also, the data manager (1) sends a message for display in the message center (2) which will indicate to the point of sale personnel that the pending task is to review the water supply.

The pending task messages shown in the message center (2) are also registered by the data manager (1) in the database (6) and a count is taken of the time since they were shown in the message center (2), said time count has a pre-established limit on the data manager (1) that, if no message is had from the data control and acquisition module (3) that indicates that said task has been carried out, the data manager (1) will send a message to the mobile device (4) and/or to the fixed device (5) of the point of sale personnel supervisor. In the same way, on registering that the task has been attended to, a message is sent again to the point of sale personnel supervisor's mobile device (4) and/or the fixed device (5) indicating that said task has been completed.

Operation of Assisted Calibration Mode:

This mode of operation is the application that the personnel authorized to calibrate the beverage preparation machines can run using a mobile device (4). Once said authorized person starts the application and selects assisted calibration mode, said application sends to the data manager (1) the identification of the point of sale that the authorized person selected on the application menu, checks on the database (6) the list of beverage preparation machines registered in said point of sale and shows them on the mobile device (4) for the authorized person to select on the application which beverage preparation machine shall be subjected to the calibration process. Once the beverage has been selected, the mobile device (4) sends to the data manager (1) the selection, which makes a delivery of a code to the data control and acquisition module (3) found in the selected machine, said module shows the code on the screen of the beverages machine for the authorized person to capture and/or scan in the field of the application that is run on their mobile device (4), with which it is confirmed that the calibration of the correct beverage preparation machine will be started. Once the code is confirmed, the mobile device (4) application shows to the authorized person on its screen a button that on being touched starts the dosing process of the first ingredient is as previously established followed by a pause for the authorized person to obtain the weight of the supplied ingredient capturing it in a field in the mobile device (4) application, then the mobile device (4) sends it to the data manager (1) which registers it in the database (6) and sends it to the data control and acquisition module (3) found in the selected machine, with which said module determines the dosing system's weight per second of said ingredient, that will be used in future beverages preparations according to the requested recipe that uses said ingredient. This process is repeated for each ingredient that the beverage preparation machine uses. On carrying out this process with all the ingredients, the mobile device (4) application notifies the authorized person that it has concluded and sends the completion message for the calibration of the beverages preparation equipment in question to the data manager (1), the latter sends in turn a message to the data control and acquisition module (3) of said equipment so that calibration mode ends and it enters into normal operation mode. On completing the calibration routine, the data manager (1) registers in the database (6) the date and time of said event, the name of the person who carried it out, the point of sale identification, the calibrated equipment calibration and the weights that were captured during the process.

Dynamic Production:

When the preparation of a beverage is started, the data control and acquisition module (3) of the beverage preparation machine in question obtains a reading of the display container's (8) data tag and sends a message to the data manager (1) which determines, through checking a previously trained artificial intelligence service, the quantity of ingredients that will be used in said preparation based on the detected display container (8), the time of day, checking the current weather on web services and the sales history registered in the database (6) for said point of sale, with which it sends a message to the data control and acquisition module (3) of said beverages preparation equipment with the required quantity data, with which the preparation that is poured into the display container is started.

Inventory Order Control:

Based on the consumption history and the stocks of supplies registered for a period of inventory assortment, the data manager (1) determines the quantity to replenish for the following delivery and sends a message of required quantities to the order manager.

Equipment Inventory Location:

When a data control and acquisition module (3) is turned on it starts a checking sequence of the unique network identification number or MAC Address of the point of sale, that is then sent to the data manager (1), that in turn checks in the database (6) the existence of said unique network identifier to verify the point of sale in which it is located; if said point of sale is different to the previous the data manager (1), said data control and acquisition module carries out the change to the new point of sale where said data control and acquisition module (3) is assigned.

What is claimed is:

1. Support method for the management of beverages bars in points of sale, comprising:
    identifying a display container associated with a beverage preparation machine through a data tag in the display container;
    determining a recipe for preparation of a beverage through a first data control and acquisition module coupled to the beverage preparation machine, according to an information associated with the data tag of the display container, the first data control and acquisition module being connected to a data manager;
    checking the data manager for historical sales history of the beverage, time of day and weather data;
    preparing a quantity of the beverage depending on the historical sales history of the beverage, the time of day and the weather data obtained from the data manager;
    obtaining information periodically from at least one sensor in the display container;
    displaying the information from the at least one sensor on a screen coupled to the display container;
    measuring the quantity of the beverage in the display container indirectly through temperature measurement of the content;
    counting time elapsed from start of preparation of the beverage;
    registering the preparation of the beverage, the time elapsed and the information from the at least one sensor in a database stored in the data manager;
    emitting an alarm from a second data control and acquisition module coupled to the display container to a message center, the alarm indicating messages for a need for a new preparation of the beverage if the beverage in the display container has expired depending on the time elapsed or the display container is empty due to consumption of the beverage, the second data control and acquisition module and the message center are connected to the data manager;
    registering the alarm in the database stored in the data manager;
    registering duration of the messages in the message center, from when they are shown until they are attended to; and
    sending a notification from the data manager to a mobile device if the messages have not been attended to in a given period of time.

2. Support method for the management of beverages bars in points of sale according to claim 1, and further comprising generating statistical reports and predictive maintenance alarms.

3. Support method for the management of beverages bars in points of sale according to claim 1, and further comprising registering information corresponding to faults.

4. Support method for the management of beverages bars in points of sale according to claim 1, and further comprising, before the preparation of the beverage, verifying quantity and temperature of available water in a water supply device coupled to the beverage preparation machine.

5. Support method for the management of beverages bars in points of sale according to claim 1, and further comprising transmitting all or part of information registered in the database of the data manager from the second data control and acquisition module of the display container, and showing on the screen coupled to the display container.

6. Support method for the management of beverages bars in points of sale according to claim 1, and further comprising determining an origin of the alarm that indicates the need for a new preparation of the beverage and registering the origin as a display cycle termination.

7. Support method for the management of beverages bars in points of sale according to claim 1, and further comprising updating pending messages or commands.

8. Support method for the management of beverages bars in points of sale according to claim 1, and further comprising showing in the message center lack of supplies.

9. Support method for the management of beverages bars in points of sale according to claim 1, and further comprising:
    starting an application on a mobile device and selecting an assisted calibration mode;

identifying a point of sale corresponding to a location of the beverage preparation machine;
selecting an option corresponding to a calibration of the beverage preparation machine;
sending a code from the data manager to the first data control and acquisition module coupled to the beverage preparation machine;
showing a sent code on a screen coupled to the beverage preparation machine;
capturing the sent code on the mobile device;
showing on a screen of the mobile device means to authorize the calibration of the beverage preparation machine;
dosing each ingredient separately, consecutively, with a pause time period in between one dosage and another, in which the pause time allows a weight of each dosed ingredient to be obtained;
capturing the weight of each dosed ingredient on the application of the mobile device;
sending the weight from the mobile device to the first data control and acquisition module;
calculating the weight per second to use in future beverage preparations;
showing a message of calibration process conclusion on a screen of the mobile device;
sending a signal to the beverage preparation machine to exit the assisted calibration mode and enter a normal operation mode;
registering a date and time of the end of the assisted calibration mode in the database and the weight to the beverage preparation machine, the point of sale and to an operator that performed the calibration.

10. Support method for the management of beverages bars in points of sale according to claim 1, and further comprising determining quantities of supplies to replenish in the beverage preparation machine in accordance with a consumption history and stocks of the supplies in the beverage preparation machine, and sending the quantities to an order manager.

11. Support method for the management of beverages bars in points of sale according to claim 1, and further comprising the following steps every time the beverage preparation machine is turned on:
checking an identification number associated to a network of the point of sale;
sending the identification number to the data manager;
checking existence of the identification number in a database of the point of sale;
corroborating an association of the identification number of the point of sale with a data control and acquisition module identifier; and
associating the identification number of the point of sale with a data control and acquisition module identifier if these are not associated.

* * * * *